US011086949B1

United States Patent
Desai et al.

(10) Patent No.: US 11,086,949 B1
(45) Date of Patent: Aug. 10, 2021

(54) SYSTEMS AND METHODS FOR INTENT GUIDED RELATED SEARCHING USING SEQUENCE SEMANTICS

(71) Applicant: FMR LLC, Boston, MA (US)

(72) Inventors: Abhishek Desai, Bangalore (IN); Bibhash Chakrabarty, Bangalore (IN); Sateesh Panda, Odisha (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/185,425

(22) Filed: Feb. 25, 2021

(51) Int. Cl.
*G06F 16/9532* (2019.01)
*H04L 29/08* (2006.01)
*G06F 16/9535* (2019.01)
*G06F 16/954* (2019.01)
*G06F 40/30* (2020.01)

(52) U.S. Cl.
CPC ........ *G06F 16/9532* (2019.01); *G06F 16/954* (2019.01); *G06F 16/9535* (2019.01); *G06F 40/30* (2020.01); *H04L 67/22* (2013.01)

(58) Field of Classification Search
None
See application file for complete search history.

(56) References Cited

U.S. PATENT DOCUMENTS

| | | | |
|---|---|---|---|
| 8,341,157 B2 | 12/2012 | Schulman | |
| 8,762,374 B1* | 6/2014 | Chen | G06N 3/0472 707/733 |
| 9,679,027 B1 | 6/2017 | Matias et al. | |
| 10,175,860 B2 | 1/2019 | Marantz et al. | |
| 10,459,964 B2* | 10/2019 | Mei | G06F 16/9535 |
| 2011/0131536 A1* | 6/2011 | Peng | G06F 16/9535 715/848 |
| 2016/0110810 A1 | 4/2016 | Ashok et al. | |
| 2016/0179970 A1 | 6/2016 | Li et al. | |
| 2018/0314689 A1* | 11/2018 | Wang | G10L 15/07 |
| 2020/0175522 A1 | 6/2020 | Zhang et al. | |
| 2020/0311165 A1* | 10/2020 | Shukl | G06F 16/9537 |

* cited by examiner

*Primary Examiner* — Robert W Beausoliel, Jr.
*Assistant Examiner* — Cheryl M Shechtman
(74) *Attorney, Agent, or Firm* — Proskauer Rose LLP

(57) ABSTRACT

Systems and methods for generating proposed search queries based on sequence semantics. The method includes receiving clickstream data from a database. The method also includes generating for each user a digital timeline based on the clickstream data. The method further includes determining for each user event pairs based on the digital timeline. The method also includes generating a vector matrix including the event pairs for each user. The method further includes receiving an initial search query from a user. The method also includes determining an intended user activity based on the initial search query. The method further includes generating proposed search queries based on the vector matrix, the intended user activity, and the initial search query.

20 Claims, 9 Drawing Sheets

SYSTEMS AND METHODS FOR INTENT GUIDED RELATED SEARCHING USING SEQUENCE SEMANTICS

FIELD OF THE INVENTION

The present invention relates generally to systems and methods for web searching and knowledge discovery, including systems and methods for information retrieval and guided navigation.

BACKGROUND OF THE INVENTION

The "Search" functionality in websites has become a vital tool that people use to navigate through the vast amount of content that is hosted on any website. "Related Questions" is a feature that has become increasingly popular in this area. The idea is to provide the user with a set of questions that are "related" to the original search phrase in a way that helps the user refine his search and ultimately get to the intended action in a faster and more seamless way.

Current implementations of related search focus mostly on "linguistic relatedness" or relatedness in terms of language. This approach has worked well in many areas. However, some drawbacks of this approach are that it cannot incorporate the hidden intent of the user behind the search and, in addition, it doesn't incorporate the sequential information of historical searches/web browsing activities. This can lead to situations where the related questions that are served don't really help the user in reaching "actionability" as fast as possible. In a lot of situations, knowing the intent behind search helps guide the user towards their need in a more effective and timely manner.

SUMMARY OF THE INVENTION

Accordingly, an object of the invention is to provide systems and methods for generating related questions based on a user search query. For example, it is an object of the invention to provide systems and methods for generating related questions based on user intent. It is an object of the invention to provide systems and methods for generating related questions based on sequence semantics. It is an object of the invention to provide systems and methods for generating proposed search queries based on user intent and sequence semantics.

In some aspects, a computerized method for generating proposed search queries based on sequence semantics includes receiving, by a server computing device, clickstream data from a database. The method further includes generating for each user, by the server computing device, a digital timeline based on the clickstream data. The method also includes determining for each user, by the server computing device, event pairs based on the digital timeline. The method further includes generating, by the server computing device, a vector matrix including the event pairs for each of the users.

Further, the method includes receiving, by the server computing device, an initial search query from a user via a user device. The method also includes determining, by the server computing device, an intended user activity based on the initial search query. Further, the method includes generating, by the server computing device, proposed search queries based on the vector matrix, the intended user activity, and the initial search query. The method also includes generating, by the server computing device, for display the proposed search queries on the user device.

In some embodiments, the server computing device is further configured to collect the clickstream data over a period of time. For example, in some embodiments, the server computing device is further configured to collect the clickstream data over one year. In other embodiments, the server computing device is further configured to store the generated vector matrix in the database.

In some embodiments, the digital timeline includes a sequence of web searches and a sequence of web page visits. For example, in some embodiments, the server computing device is further configured to remove data corresponding to consecutive events from the digital timeline.

In some embodiments, the server computing device is further configured to generate unweighted proposed search queries based on the vector matrix and the initial search query. For example, in some embodiments, the server computing device is further configured to calculate a similarity score based on the vector matrix for each of the unweighted proposed search queries and the intended user activity.

In some embodiments, the server computing device is further configured to generate weighted proposed search queries based on the similarity score calculated based on the vector matrix for each of the unweighted proposed search queries and the initial search query. For example, in some embodiments, the server computing device is further configured to generate the proposed search queries based on the weighted proposed search queries.

In some aspects, a system for generating proposed search queries based on sequence semantics includes a server computing device communicatively coupled to a user device and a database over a network. The server computing device is configured to receive clickstream data from the database. The server computing device is also configured to generate for each user a digital timeline based on the clickstream data. Further, the server computing device is configured to determine for each user event pairs based on the digital timeline. The server computing device is further configured to generate a vector matrix including the event pairs for each of the users.

The server computing device is also configured to receive an initial search query from a user via the user device. The server computing device is further configured to determine an intended user activity based on the initial search query. Further, the server computing device is configured to generate proposed search queries based on the vector matrix, the intended user activity, and the initial search query. The server computing device is also configured to generate for display the proposed search queries on the user device.

In some embodiments, the server computing device is further configured to collect the clickstream data over a period of time. For example, in some embodiments, the server computing device is further configured to collect the clickstream data over one year. In other embodiments, the server computing device is further configured to store the generated vector matrix in the database.

In some embodiments, the digital timeline includes a sequence of web searches and a sequence of web page visits. For example, in some embodiments, the server computing device is further configured to remove data corresponding to consecutive events from the digital timeline.

In some embodiments, the server computing device is further configured to generate unweighted proposed search queries based on the vector matrix and the initial search query. For example, in some embodiments, the server computing device is further configured to calculate a similarity score based on the vector matrix for each of the unweighted proposed search queries and the intended user activity.

In some embodiments, the server computing device is further configured to generate weighted proposed search queries based on the similarity score calculated based on the vector matrix for each of the unweighted proposed search queries and the initial search query. For example, in some embodiments, the server computing device is further configured to generate the proposed search queries based on the weighted proposed search queries.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for generating related questions based on a user search query. The system and methods can include mechanisms or methods for generating related questions based on user intent. The systems and methods described herein can provide mechanisms or methods for generating related questions based on sequence semantics. The systems and methods described herein can provide mechanisms or methods for generating proposed search queries based on user intent and sequence semantics.

Figure 1:
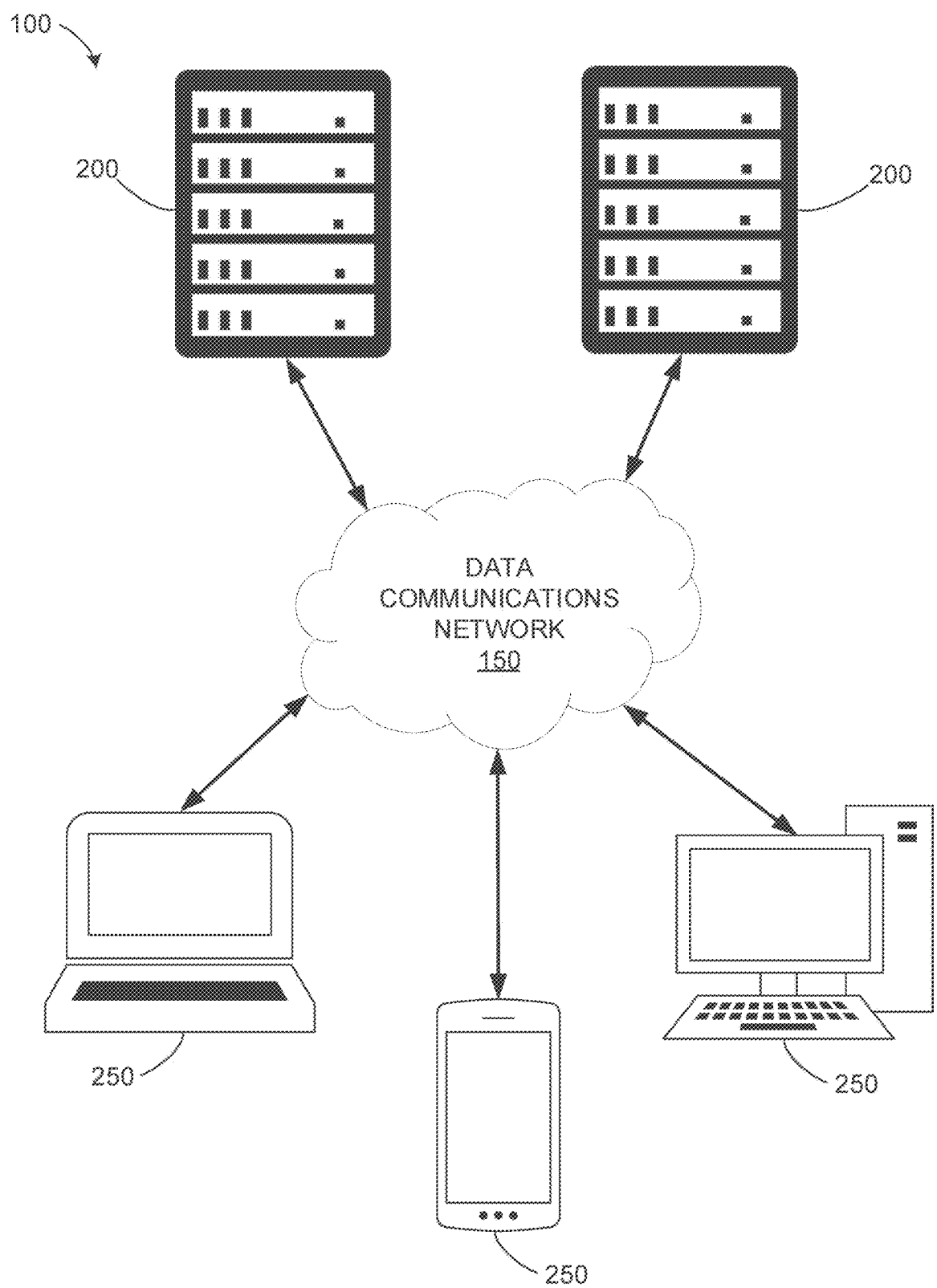
FIG. 1 is a block diagram of an exemplary data communications network, according to embodiments of the technology described herein.
Figure 2:
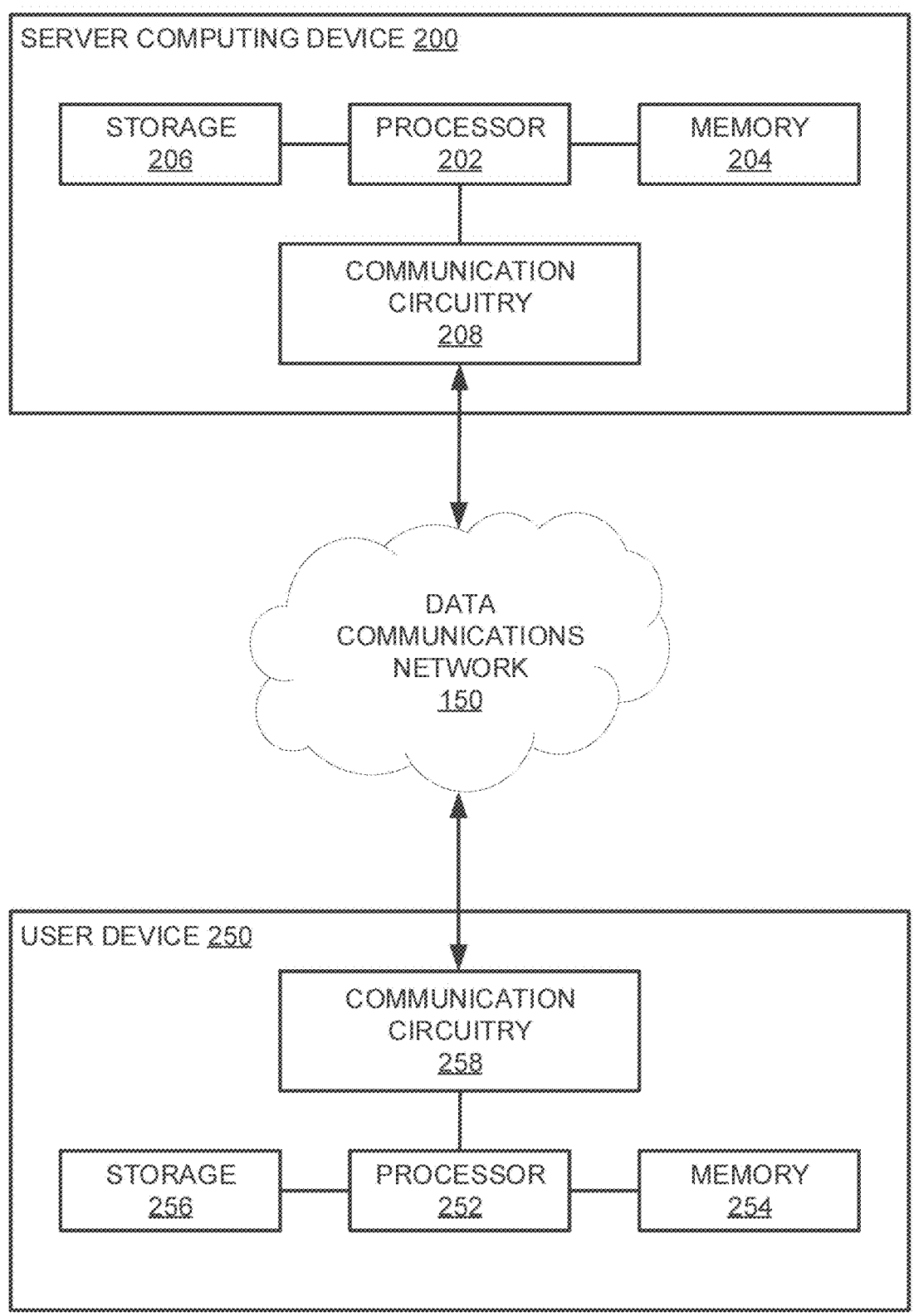
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

The systems and methods described herein take user intent as an input in the process of determining related questions. The systems and methods described herein also leverages from the sequential nature in which searches are performed by users. For example, the sequence inherent in web browsing activity contains a lot of semantic information that can be used. The user is effectively guided through a combination of intent and the sequence semantics of web activity.

Figure 3:
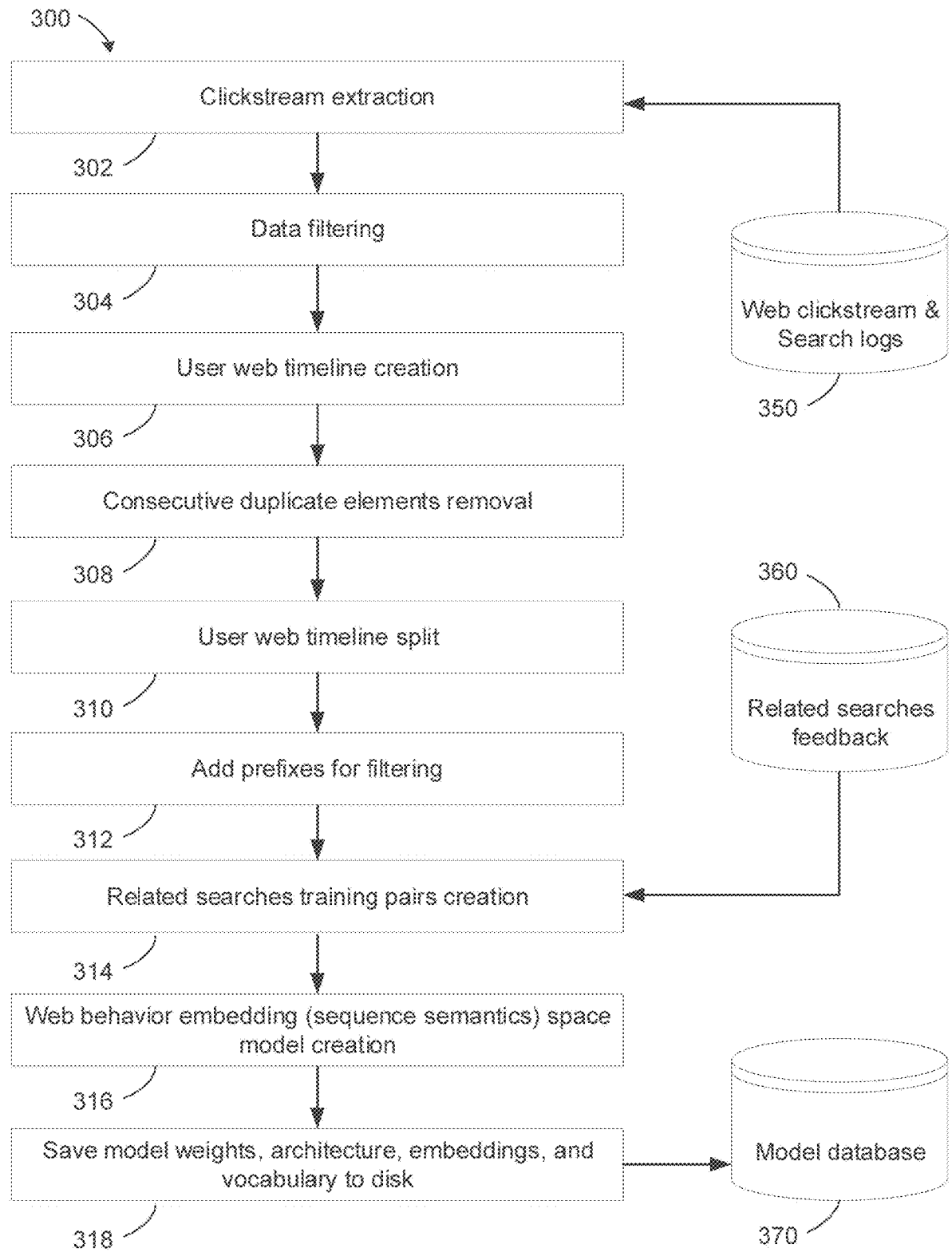
FIG. 3 is a flow diagram of a computer-implemented method for generating a web behavior embedding space using sequence semantics, according to embodiments of the technology described herein.

For example, an exemplary process 300 for generating a web behavior embedding space using communications system 100 is illustrated in FIG. 3. Process 300 generates the web behavior embedding space using sequence semantics. Process 300 begins with clickstream extraction in step 302. During this step, the web clickstream is extracted from web clickstream and search logs 350 for users with at least one search activity within a defined time period. In some embodiments, the defined time period is one year. In other embodiments, the defined time period is one month. Process 300 continues by data filtering in step 304. In some embodiments, data filtering involves removing high frequency pages and long sessions.

Figure 4:
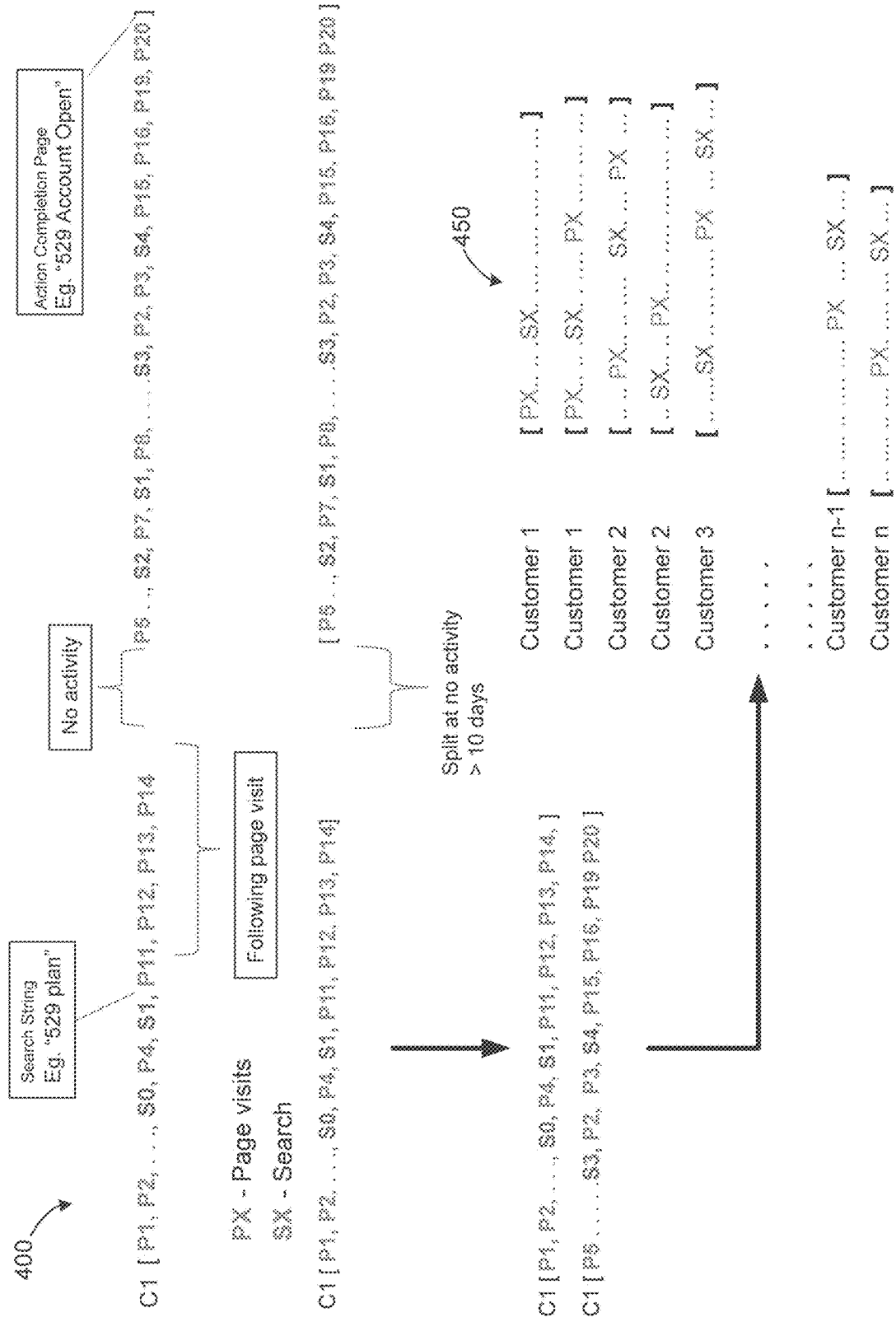
FIG. 4 is a diagram showing a visualization of an exemplary digital timeline and dataset, according to embodiments of the technology described herein.

Process 300 continues with user web timeline creation in step 306. During this step, the searches and page visits for each user is sequenced in order of timestamp. For example, referring to FIG. 4, an exemplary digital timeline 400 and dataset 450 is illustrated. Each page visit or search is an element of the timeline 400. Process 300 continues with removal of consecutive duplicate elements from the timeline in step 308. For example, as shown in FIG. 4, the elements that are consecutively repeated are removed. Process 300 continues by splitting the user web timeline if there is no activity after a defined time period in step 310. In some embodiments, the defined time period is ten days. In other embodiments, the defined time period is five days.

Process 300 continues by adding prefixes to the elements of the timeline for filtering in step 312. For example, in some embodiments, the prefix #PN is added to pages and #SP is added to search phrases. These prefixes are used to filter out search phrases and pages. Process 300 proceeds by leveraging related searches feedback 360 to create pairs of elements from the same timeline as positive samples and from randomly different timelines as negative samples in step 314. In some embodiments, skip-gram scheme is used. In other embodiments, the scheme involves picking elements from a forward looking window only.

Process 300 continues with web behavior embedding and space model creation using sequence semantics in step 316. In some embodiments, web behavior embedding and space model creation is achieved using a deep learning architecture. For example, in some embodiments, the deep learning architecture is word2vec. The web behavior embedding and space model creation relies on the created pairs of elements to train. In some embodiments, model building includes creating a probability matrix which includes the probability for a subsequent search phrase for each input search phrase. Process 300 finishes by saving the model weights, architecture, embeddings, and vocabulary to model database 370 in step 318.

Figure 5:
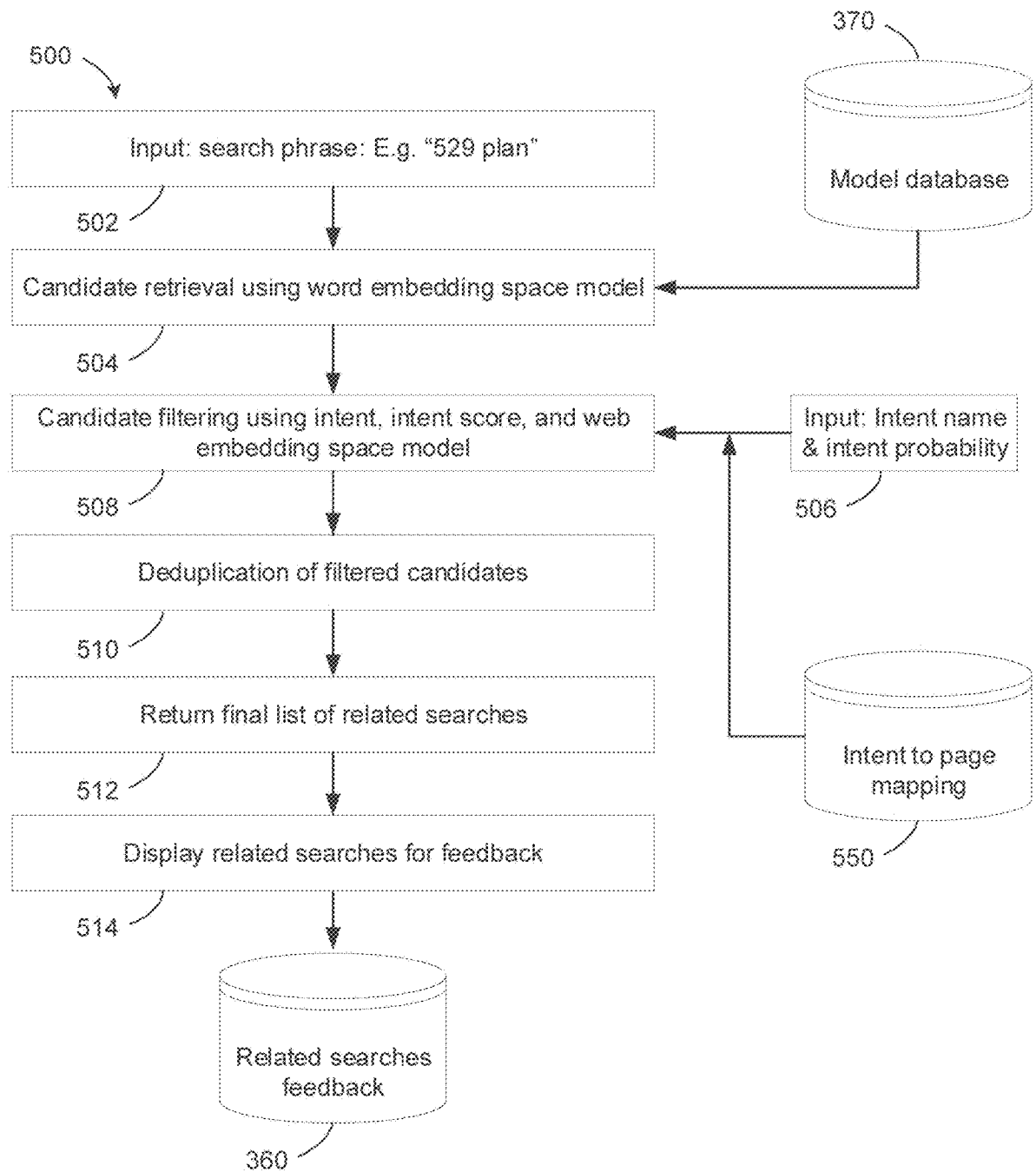
FIG. 5 is a flow diagram of a computer-implemented method for generating related searches based on intent and intent probability, according to embodiments of the technology described herein.

Referring to FIG. 5, an exemplary process 500 for generating related searches based on intent and intent probability using communications system 100 is illustrated. Process 500 begins by inputting a search phrase into the model in step 502. The input search phrase is the input from which related searches or queries are generated. Process 500 continues by retrieving a list of related search candidates from model database 370 in step 504. The list of related search candidates are close to the input search phrase based on sequence semantics. Step 504 is further described below in relation to FIG. 6.

Process 500 continues by inputting an intent name and intent probability in step 506. In some embodiments, the intent name and intent probability is retrieved from an external system. The intent name and intent probability is used to determine a corresponding page using intent to page mapping database 550. Process 500 continues by filtering the list of candidates using intent, intent probability, and the web embedding space model in step 508. In some embodiments, each candidate is scored by combining their closeness to the search phrase and closeness to intent page along with the intent probability. Closeness is based on sequential semantics. Step 508 is further described below in relation to FIG. 7.

Process 500 continues with de-duplication of the filtered candidates in step 510. For example, in some embodiments, a custom algorithm is used based on short text similarity. The algorithm compares pairs and rejects one if the similarity is above a threshold. Step 510 is further described below in relation to FIG. 8. Process 500 continues by returning a final list of related searches or queries in step 512. In some embodiments, the final list is ordered by candidate score. Process 500 finishes by displaying the related searches or queries based on the final list for feedback and storing the related searches in database 360.

Figure 6:
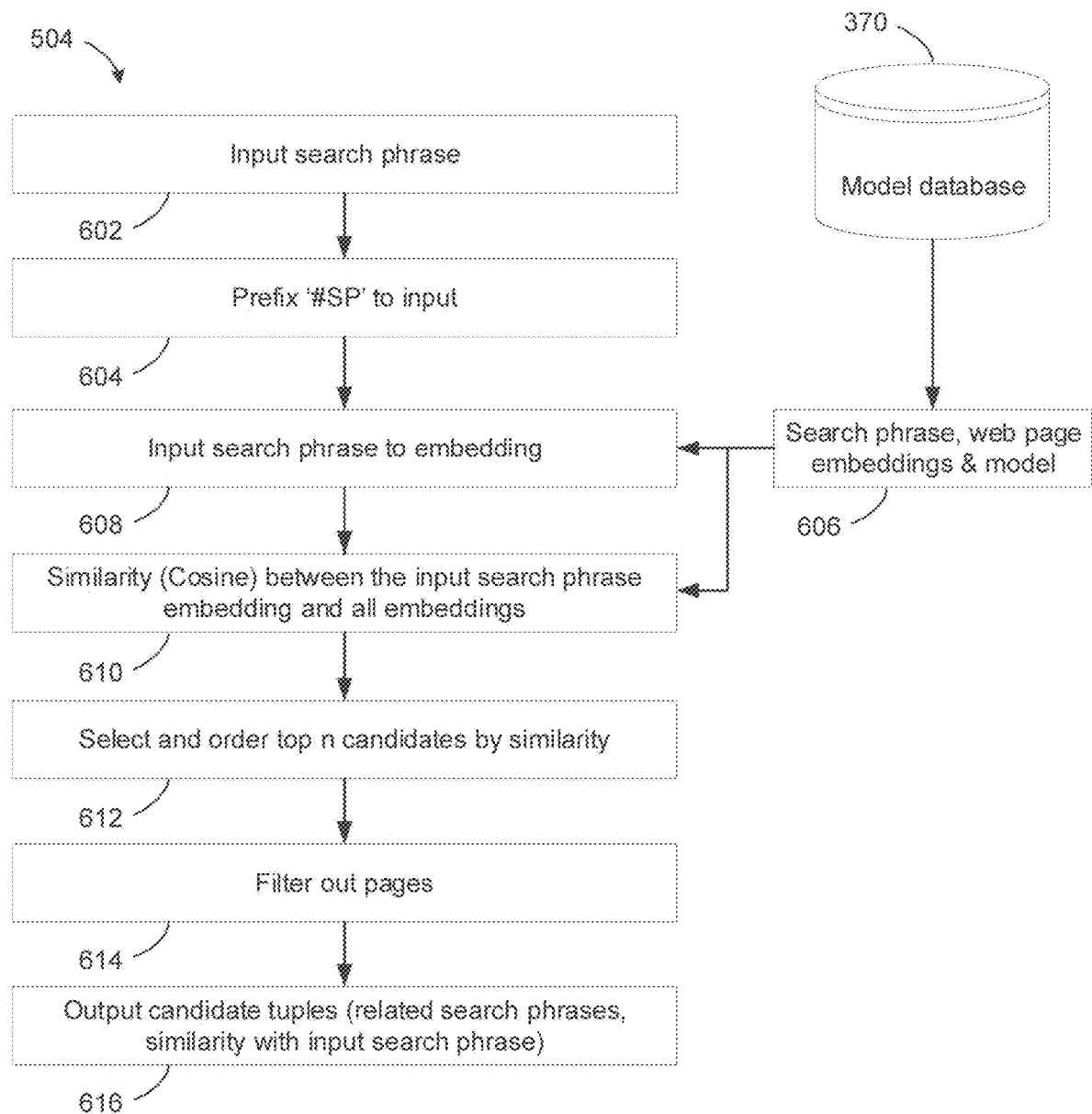
FIG. 6 is a flow diagram of a computer-implemented method for generating related searches using a word embedding space model, according to embodiments of the technology described herein.

Referring to FIG. 6, an exemplary process 504 for generating related searches using a word embedding space model using communications system 100 is illustrated. Process 504 begins with inputting a search phrase into the model in step 602. Process 504 continues by adding the prefix #SP to the input in step 604. Process 504 continues by retrieving the web page embeddings and model from model database 370 in step 606. Process 504 continues by inputting the search phrase to embedding in step 608. In some embodiments, the search phrase is inputted to embedding through lookup in embeddings. In other embodiments, the search phrase is inputted to embedding by computing the embedding through the model.

Process 504 continues by calculating a cosine similarity between the input search phrase embedding and all embeddings in step 610. Process 504 continues by selecting and ordering the top n candidates based on the calculated similarity in step 612. Process 504 continues by filtering out pages by removing candidates with the prefix #PN and keeping only the candidates with the prefix #SP in step 614. Process 504 finishes by outputting candidate tuples in step 616. In some embodiments, candidate tuples include related search phrases and the corresponding similarity with the input search phrase.

Figure 7:
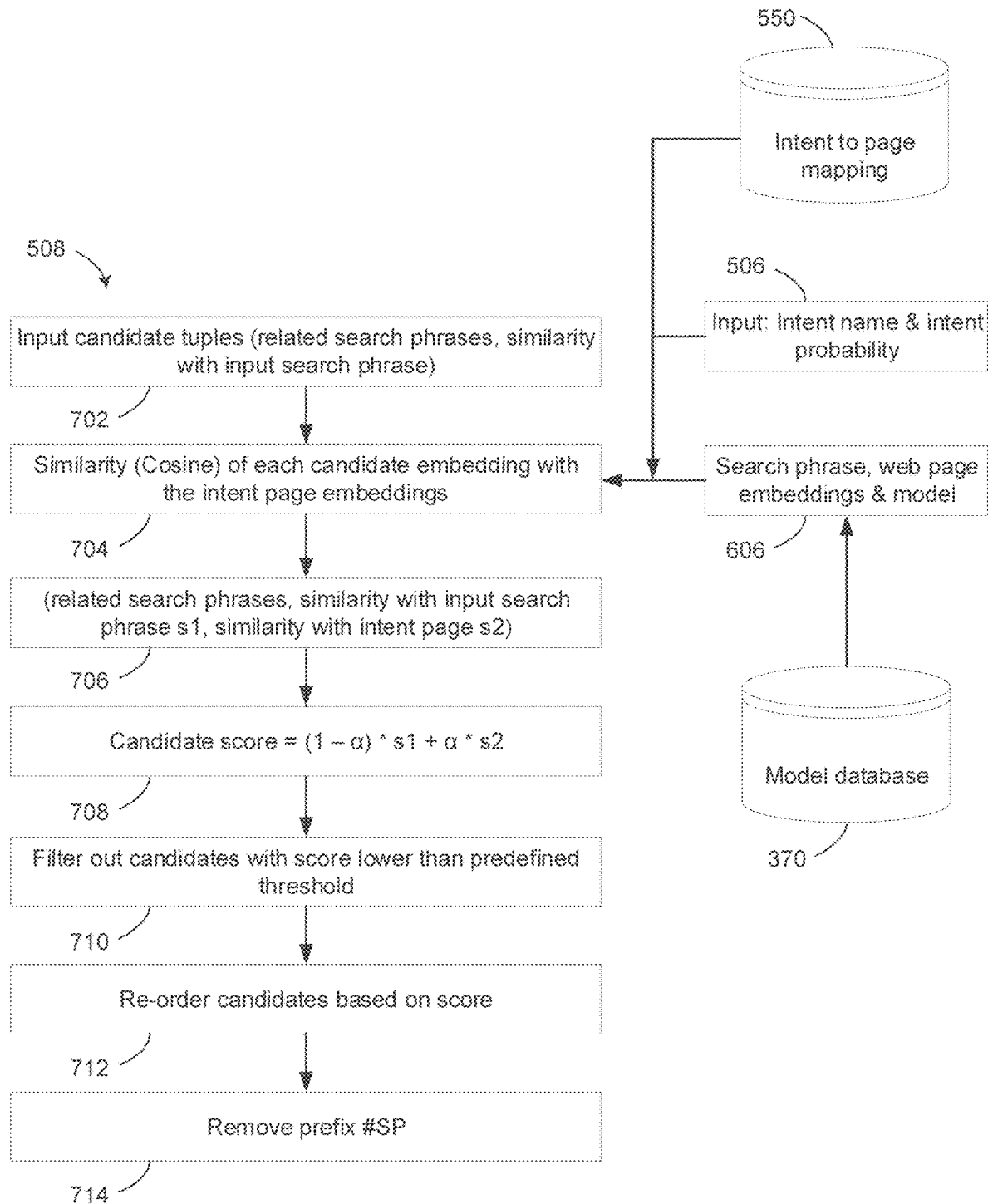
FIG. 7 is a flow diagram of a computer-implemented method for filtering related searches based on intent and intent probability, according to embodiments of the technology described herein.

Referring to FIG. 7, an exemplary process 508 for filtering related searches based on intent and intent probability using communications system 100 is illustrated. Process 508 begins by inputting candidate tuples in step 702. In some embodiments, candidate tuples include related search phrases and the corresponding similarity with the input search phrase. Process 508 continues by calculating the cosine similarity of each candidate embedding with the intent page embeddings in step 704. Process 508 continues by returning the related search phrases along with the similarity with the input search phrase and the similarity with the intent page in step 706.

Process 508 continues by calculating candidate scores for each candidate in step 708. The candidate score is based on the result of $(1-\alpha)*s1+\alpha*s2$, where s1 is the similarity with the input search phrase and s2 is the similarity with the intent page. Process 508 continues by filtering out candidates with a similarity score lower than a predefined threshold in step 710. Process 508 continues by reordering the candidates based on their calculated score in step 712. Process 508 finishes by removing the prefix #SP from each candidate in step 714.

Figure 8:
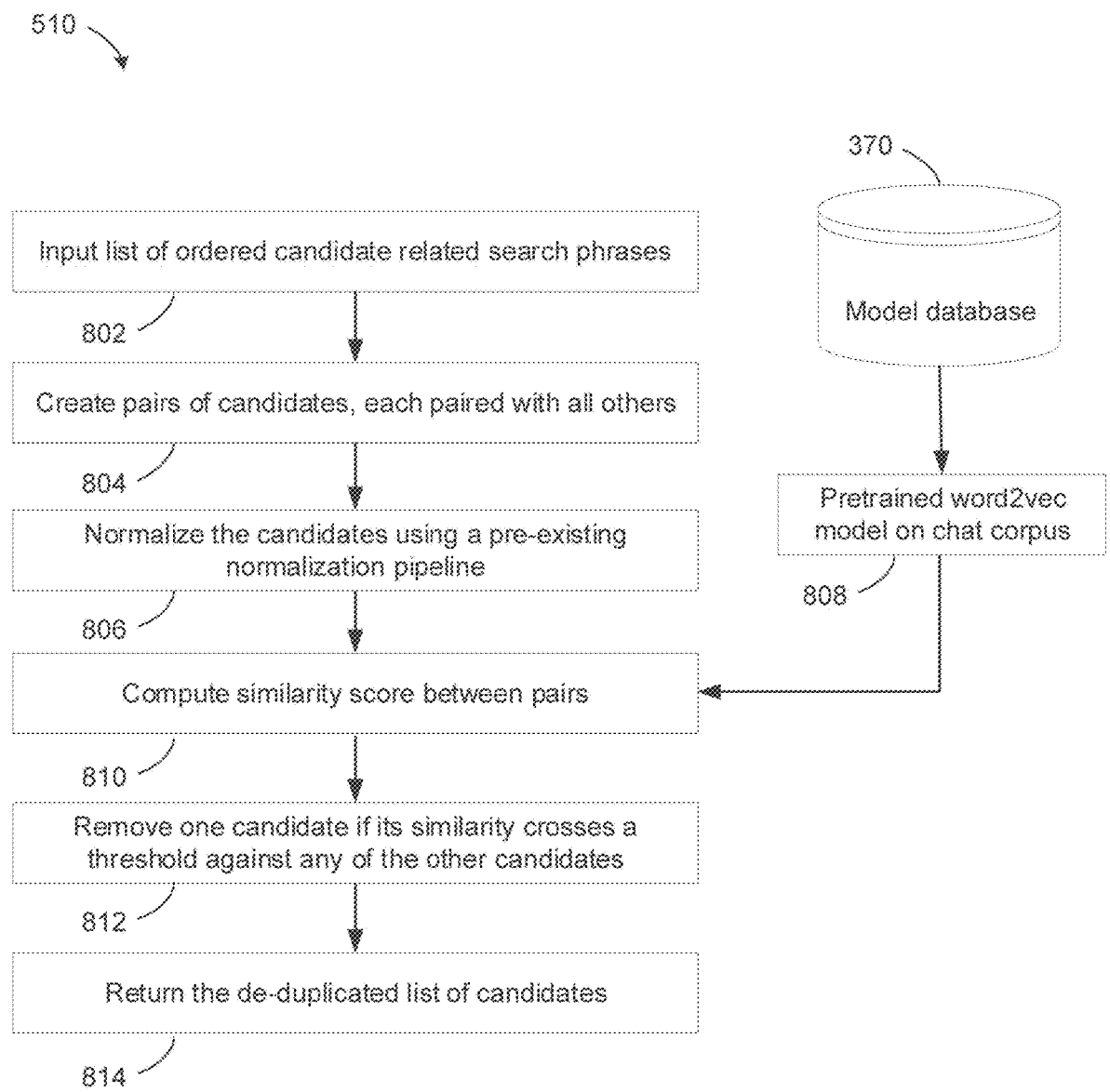
FIG. 8 is a flow diagram of a computer-implemented method for de-duplicating related searches based on similarity scores, according to embodiments of the technology described herein.

Referring to FIG. 8, an exemplary process 510 for de-duplicating related searches based on similarity scores using communications system 100 is illustrated. Process 510 begins by inputting the list of ordered candidate related search phrases in step 802. Process 510 continues by creating pairs of candidates, each paired with all other candidates, in step 804. Process 510 continues by normalizing the candidates using a pre-existing normalization pipeline in step 806. Process 510 continues by retrieving a pre-trained model from model database 370. In some embodiments, the pre-trained model includes word2vec. Process 510 continues by calculating a similarity score between the pairs of candidates in step 810. Process 510 continues by removing one candidate if its similarity score is greater than a threshold against any of the other candidates in step 812. Process 510 finished by returning the de-duplicated list of candidates in step 814.

Figure 9:
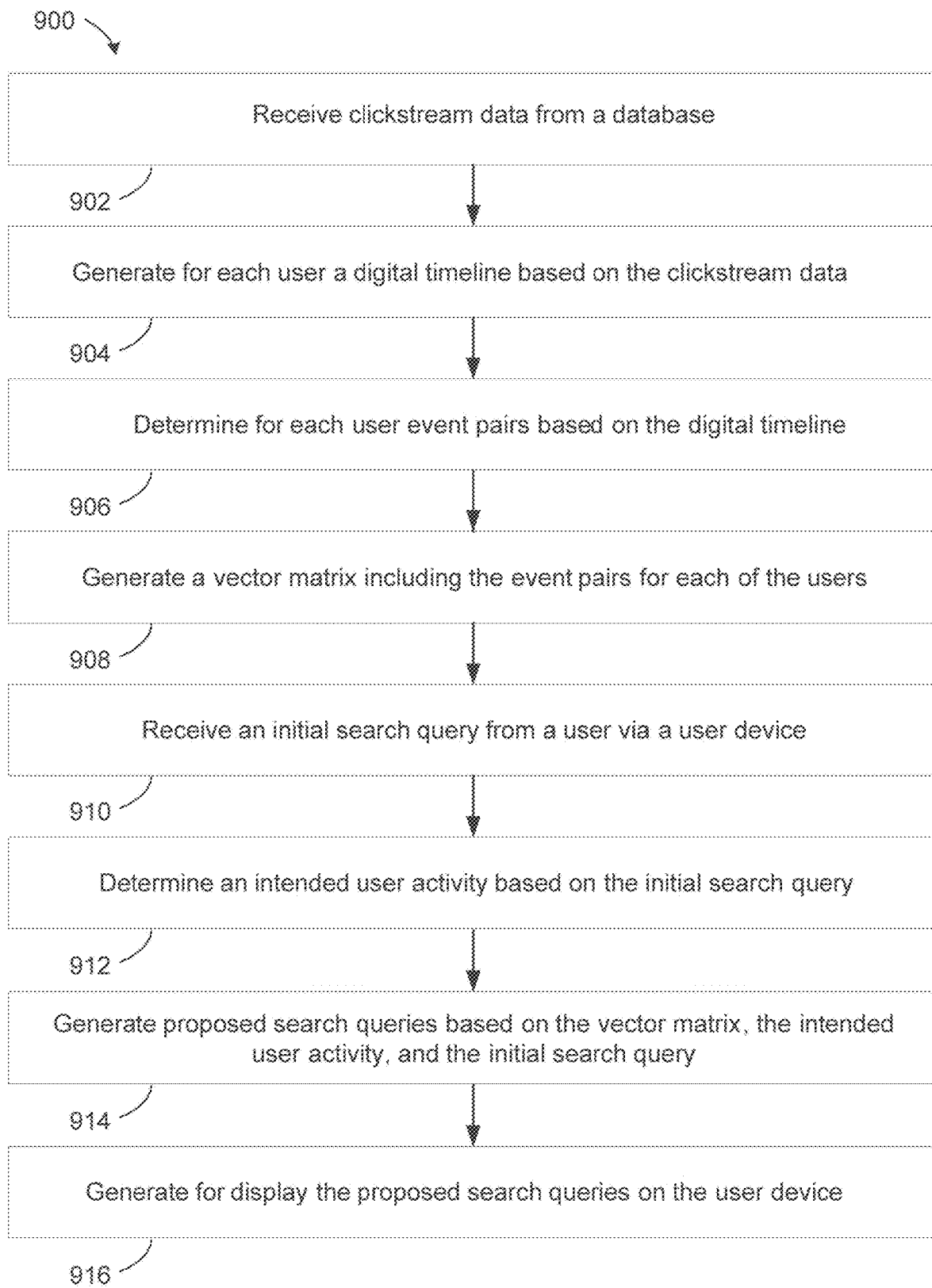
FIG. 9 is a flow diagram of a computer-implemented method for generating proposed search queries based on sequence semantics, according to embodiments of the technology described herein.

Referring to FIG. 9, a process 900 for generating proposed search queries based on sequence semantics using communications system 100 is illustrated. The process 900 begins by receiving, by a server computing device 200, clickstream data from a database in step 902. For example, in some embodiments, the server computing device 200 is configured to collect the clickstream data over a period of time. In some embodiments, the server computing device 200 is configured to collect the clickstream data over one year.

Process 600 continues by generating for each user, by the server computing device 200, a digital timeline based on the clickstream data in step 904. For example, in some embodiments, the digital timeline includes a sequence of web searches and a sequence of web page visits. In some embodiments, the server computing device 200 is configured to remove data corresponding to consecutive events from the digital timeline. Process 900 continues by determining for each user, by the server computing device 200, event pairs based on the digital timeline in step 906.

Process 900 continues by generating, by the server computing device 200, a vector matrix including the event pairs for each of the users in step 908. For example, in some embodiments, the server computing device 200 is configured to store the generated vector matrix in the database. Process 900 continues by receiving, by the server computing device 200, an initial search query from a user via a user device 250 in step 910.

Process 900 continues by determining, by the server computing device 200, an intended user activity based on the initial search query in step 912. Process 900 continues by generating, by the server computing device 200, proposed search queries based on the vector matrix, the intended user activity, and the initial search query in step 914. In some embodiments, the server computing device 200 is configured to generate unweighted proposed search queries based on the vector matrix and the initial search query. For example, in some embodiments, the server computing device 200 is configured to calculate a similarity score based on the vector matrix for each of the unweighted proposed search queries and the intended user activity.

In some embodiments, the server computing device 200 is configured to generate weighted proposed search queries based on the similarity score calculated based on the vector matrix for each of the unweighted proposed search queries and the initial search query. For example, in some embodiments, the server computing device 200 is configured to generate the proposed search queries based on the weighted proposed search queries. Process 900 finishes by generating, by the server computing device 200, for display the proposed search queries on the user device 250 in step 916.

In some aspects, process 900 can be implemented on a system for generating proposed search queries based on sequence semantics. The system includes a server computing device 200 communicatively coupled to a user device 250 and a database over a network 150. The server computing device 200 is configured to receive clickstream data from the database. In some embodiments, the server computing device 200 is configured to collect the clickstream data over a period of time. For example, in some embodiments, the server computing device 200 is configured to collect the clickstream data over one year.

The server computing device 200 is also configured to generate for each user a digital timeline based on the clickstream data. The server computing device 200 is also configured to determine for each user event pairs based on the digital timeline. In some embodiments, the digital timeline includes a sequence of web searches and a sequence of web page visits. For example, in some embodiments, the server computing device 200 is configured to remove data corresponding to consecutive events from the digital timeline.

The server computing device 200 is also configured to generate a vector matrix including the event pairs for each of the users. In some embodiments, the server computing device 200 is configured to store the generated vector matrix in the database. Further, the server computing device 200 is configured to receive an initial search query from a user via the user device 250. The server computing device 200 is also configured to determine an intended user activity based on the initial search query. Further, the server computing device 200 is configured to generate proposed search queries based on the vector matrix, the intended user activity, and the initial search query. The server computing device 200 is further configured to generate for display the proposed search queries on the user device 250.

In some embodiments, the server computing device 200 is configured to generate unweighted proposed search queries based on the vector matrix and the initial search query. For example, in some embodiments, the server computing device 200 is configured to calculate a similarity score based on the vector matrix for each of the unweighted proposed search queries and the intended user activity. In some embodiments, the server computing device 200 is configured to generate weighted proposed search queries based on the similarity score calculated based on the vector matrix for each of the unweighted proposed search queries and the initial search query. For example, in some embodiments, the server computing device 200 is configured to generate the proposed search queries based on the weighted proposed search queries.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for generating proposed search queries based on sequence semantics, the method comprising:
receiving, by a server computing device, clickstream data from a database;
generating for each of a plurality of users, by the server computing device, a digital timeline based on the clickstream data;
determining for each of the plurality of users, by the server computing device, a plurality of event pairs based on the digital timeline;
generating, by the server computing device, a vector matrix comprising the plurality of event pairs for each of the plurality of users;
receiving, by the server computing device, an initial search query from a user of the plurality of users via a user device;
determining, by the server computing device, an intended user activity based on the initial search query;
generating, by the server computing device, a plurality of proposed search queries based on the vector matrix, the intended user activity, and the initial search query; and generating, by the server computing device, for display the plurality of proposed search queries on the user device.

2. The computerized method of claim 1, wherein the server computing device is further configured to collect the clickstream data over a period of time.

3. The computerized method of claim 2, wherein the server computing device is further configured to collect the clickstream data over one year.

4. The computerized method of claim 1, wherein the digital timeline comprises a sequence of web searches and a sequence of web page visits.

5. The computerized method of claim 4, wherein the server computing device is further configured to remove data corresponding to consecutive events from the digital timeline.

6. The computerized method of claim 1, wherein the server computing device is further configured to store the generated vector matrix in the database.

7. The computerized method of claim 1, wherein the server computing device is further configured to generate a plurality of unweighted proposed search queries based on the vector matrix and the initial search query.

8. The computerized method of claim 7, wherein the server computing device is further configured to calculate a similarity score based on the vector matrix for each of the plurality of unweighted proposed search queries and the intended user activity.

9. The computerized method of claim 8, wherein the server computing device is further configured to generate a plurality of weighted proposed search queries based on the similarity score calculated based on the vector matrix for each of the plurality of unweighted proposed search queries and the initial search query.

10. The computerized method of claim 9, wherein the server computing device is further configured to generate the plurality of proposed search queries based on the plurality of weighted proposed search queries.

11. A system for generating proposed search queries based on sequence semantics, the system comprising:
a server computing device communicatively coupled to a user device and a database over a network, the server computing device configured to:
receive clickstream data from the database;
generate for each of a plurality of users a digital timeline based on the clickstream data;
determine for each of the plurality of users a plurality of event pairs based on the digital timeline;
generate a vector matrix comprising the plurality of event pairs for each of the plurality of users;
receive an initial search query from a user of the plurality of users via the user device;
determine an intended user activity based on the initial search query;
generate a plurality of proposed search queries based on the vector matrix, the intended user activity, and the initial search query; and
generate for display the plurality of proposed search queries on the user device.

12. The system of claim 11, wherein the server computing device is further configured to collect the clickstream data over a period of time.

13. The system of claim 12, wherein the server computing device is further configured to collect the clickstream data over one year.

14. The system of claim 11, wherein the digital timeline comprises a sequence of web searches and a sequence of web page visits.

15. The system of claim 14, wherein the server computing device is further configured to remove data corresponding to consecutive events from the digital timeline.

16. The system of claim 11, wherein the server computing device is further configured to store the generated vector matrix in the database.

17. The system of claim 11, wherein the server computing device is further configured to generate a plurality of unweighted proposed search queries based on the vector matrix and the initial search query.

18. The system of claim 17, wherein the server computing device is further configured to calculate a similarity score based on the vector matrix for each of the plurality of unweighted proposed search queries and the intended user activity.

19. The system of claim 18, wherein the server computing device is further configured to generate a plurality of weighted proposed search queries based on the similarity score calculated based on the vector matrix for each of the plurality of unweighted proposed search queries and the initial search query.

20. The system of claim 19, wherein the server computing device is further configured to generate the plurality of proposed search queries based on the plurality of weighted proposed search queries.

* * * * *